Patented Oct. 29, 1929

1,733,962

UNITED STATES PATENT OFFICE

ROBERT HAMBURGER, STEFAN KAESZ, AND FRIDOLIN HARTIG, OF FREUDENTHAL, CZECHOSLOVAKIA, ASSIGNORS, BY MESNE ASSIGNMENTS, TO STANDARD BRANDS INCORPORATED, OF DOVER, DELAWARE, A CORPORATION OF DELAWARE

PROCESSES OF MANUFACTURING YEAST

No Drawing. Application filed November 11, 1924, Serial No. 749,334, and in Germany March 3, 1924.

Our invention relates to the manufacture of yeast and particularly to a method of rendering a nutrient solution highly adaptable for utilization in yeast manufacture, and has as a general object the attainment of this end in a convenient, efficient and economical manner.

A more specific object is so to treat a nutrient solution or material subsequently to be used for yeast manufacture, as simultaneously to incorporate therein desirable yeast nutrient substances and to eliminate therefrom substances which are deleterious and harmful in the manufacture of yeast.

Other objects of the invention will in part be obvious and will in part appear hereinafter.

If ammonium salts are used as the sole or main source of nitrogen in growing yeast, the acidity of the fermenting mass will increase at a rate substantially approximating the rate at which the ammonia is consumed by the yeast. This increase of acidity involves considerable inconvenience. For this reason the mineral acids liberated by the action of the growing yeast are usually rendered innocuous by neutralization. This measure does not however remove the anions of the mineral acids which adversely affect the growth and the quality of the yeast but on the contrary leads to the introduction of cations also. It has therefore been the practice to employ free ammonia which is however considerably more expensive than for instance ammonium sulphate and moreover necessitates a more careful control of the fermentation process.

The present invention aims at overcoming the aforesaid drawbacks. To this end, according to the invention, the nitrogenous yeast food is supplied to the nutrient medium by interaction of lactate of lime and ammonium sulphate.

In carrying out the process, lactic acid is generated in the wort or nutrient solution by means of microorganisms, the amount of acid being advanced to the desired degree by adding basic calcium compounds for the purpose of continually neutralizing the lactic acid at the rate of its formation. When the desired amount of acid has been reached, ammonium sulphate is added for the purpose of producing ammonium lactate in the solution, the insoluble calcium sulphate being precipitated. The ammonium sulphate is consequently added in substantially molecular reactive proportions based on the amount of calcium in the solution.

The $SO_4$ anions and the Ca cations are thus almost completely eliminated from the nutrient solution in the most advantageous manner, and the harmful effects thereof on the yeast in many respects, especially as to appearance and colour are obviated. A supplementary advantage is that the calcium sulphate also exercises a clarifying action on the nutrient solution during its precipitation, which action is particularly of importance, when molasses is to be worked up. It is in general, an advantage of the present method, that even when using molasses as originating material, the maximum possible yield can be obtained without deterioration in the quality of the yeast.

In acidulating wort to be used in subsequent alcoholic fermentation, it has already been known to add to the materials undergoing a lactic acid fermentation, basic substances such as for instance ammonia, for the purpose of partly neutralizing the lactic acid to provoke a more intense generation of acid and simultaneously to produce an ample stock of organic salts acting in the subsequent yeast fermentation as nutrient for the yeast. In contradistinction to this measure the present process offers the possibility of satisfying the nitrogen requirements of the entire yield of yeast only or principally by the addition of ammonium sulphate to a wort or nutrient solution containing a certain amount of lactic acid combined with lime.

Since certain changes may be made in the above process and different embodiments of the invention could be made without departing from the scope thereof, it is intended that all matter contained in the above descriptions shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What we claim as new and desire to secure by Letters Patent is:—

1. A process of treating a yeast nutrient medium prior to yeast manufacture therein, simultaneously to clarify and increase its yeast-assimilable nitrogen content which includes commingling calcium lactate therewith, precipitating calcium from the medium by the addition of ammonium sulphate and separating the precipitate.

2. A process of treating a carbohydrate containing yeast nutrient medium simultaneously to clarify and increase its yeast-assimilable nitrogen content which includes inoculating the medium with lactic acid forming bacteria, allowing the inoculated media to stand at a temperature favoring the formation of lactic acid, neutralizing the formed lactic acid by the addition of a basic calcium compound, admixing ammonium sulphate in amounts at least sufficient to precipitate the calcium from the medium and separating the precipitate.

3. A process of clarifying molasses and increasing the yeast assimilable nitrogen content thereof to render it suitable for subsequent manufacture therein which comprises inoculating the molasses with a lactic acid forming bacteria, allowing the inoculated media to stand at a temperature favoring the formation of lactic acid, neutralizing the formed lactic acid by the addition of a basic calcium compound, admixing therewith ammonium sulphate in amounts at least sufficient to precipitate the calcium from the molasses and separating the precipitate.

In testimony whereof we have affixed our signatures.

ROBERT HAMBURGER.
STEFAN KAESZ.
FRIDOLIN HARTIG.